US011659360B2

(12) United States Patent
Higuchi et al.

(10) Patent No.: US 11,659,360 B2
(45) Date of Patent: May 23, 2023

(54) SYSTEM AND METHOD FOR IMPLEMENTING PEER-TO-PEER WIRELESS GROUPS FOR VEHICULAR MICRO CLOUDS

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/407,662

(22) Filed: Aug. 20, 2021

(65) Prior Publication Data
US 2023/0055126 A1    Feb. 23, 2023

(51) Int. Cl.
*H04W 4/08*    (2009.01)
*H04W 36/30*    (2009.01)
(Continued)

(52) U.S. Cl.
CPC .............. *H04W 4/08* (2013.01); *H04W 4/46* (2018.02); *H04W 36/30* (2013.01); *H04W 84/18* (2013.01)

(58) Field of Classification Search
CPC ....... H04W 84/18; H04W 4/80; H04W 76/14; H04W 4/08; H04W 84/12; H04W 8/005;
(Continued)

(56) References Cited

U.S. PATENT DOCUMENTS 9,532,193 B2    12/2016 Smadi et al.
11,452,032 B2 *  9/2022 Gupta ................... H04W 24/08
(Continued)

OTHER PUBLICATIONS

Application of Micro Cloud for Cooperative Vehicles by Rishitha Gona B.Tech., Keshav Memorial Institute of Technology, School of Computing in the Graduate School Southern Illinois University Carbondale, Aug. 2020.*
(Continued)

*Primary Examiner* — Golam Sorowar
(74) *Attorney, Agent, or Firm* — Christopher G. Darrow; Darrow Mustafa PC

(57) ABSTRACT

Describe are systems and methods for implementing a peer-to-peer (P2P) wireless group acting as a vehicular micro cloud. In one example, a system includes a processor and a memory in communication with the processor having a group coordination service module. The group coordination service module has instructions that, when executed by the processor, cause the processor to select a vehicle out of a plurality of vehicles to act as a group owner of a P2P wireless group operating as a vehicular micro cloud based on vehicle status information from the plurality of vehicles and transmit group configurations of the first P2P wireless group to the plurality of vehicles to allow the plurality of vehicles to join the first P2P wireless group. The selection of the vehicle may be based on how long the vehicle is predicted to be a member of the vehicular micro cloud.

17 Claims, 7 Drawing Sheets

(51) Int. Cl.
*H04W 84/18* (2009.01)
*H04W 4/46* (2018.01)

(58) Field of Classification Search
CPC .......... H04W 4/44; H04W 4/46; H04W 4/40; H04W 4/70; H04W 48/16; H04W 40/20; H04W 92/18; H04W 28/06; H04W 4/00; H04W 40/02; H04W 48/02; H04W 48/18; H04W 80/02; H04W 84/005; H04W 12/03; H04W 28/0215; H04W 36/0009; H04W 36/08; H04W 4/02; H04W 4/10; H04W 48/06; H04W 48/12; H04W 52/0206; H04L 67/12; H04L 67/104; H04L 67/1046; H04L 67/1091; H04L 67/1044; H04L 67/60; H04L 67/1051; H04L 1/008; H04L 43/0811; H04L 43/0858; H04L 43/0876; H04L 45/12; H04L 51/02; H04L 61/2592; H04L 63/0227; H04L 69/18; H04L 63/065; H04L 67/1097; H04L 67/306; H04L 67/51; H04L 9/3239; H04L 9/50; H04L 2209/80; H04L 41/12; H04L 41/5009; H04L 43/04; H04L 63/0428; H04L 67/06; H04L 67/108

See application file for complete search history.

(56) References Cited

U.S. PATENT DOCUMENTS

2012/0158820 A1* 6/2012 Bai .................. G07C 5/008
            709/202
2020/0226921 A1  7/2020  Higuchi et al.
2021/0211851 A1  7/2021  Higuchi et al.

OTHER PUBLICATIONS

De Almeida et al., "Wi-Fi Direct Performance Evaluation for V2P Communications," Journal of Sensor and Actuator Networks, 9(2), 28, 20 pages (2020).

Khan et al., "A Novel UAV-Aided Network Architecture Using Wi-Fi Direct," IEEE Access, 7, 67305-67318 (2019).

Krijestorae et al., "Hybrid Vehicular and Cloud Distributed Computing: A Case for Cooperative Perception," 6 pages, arXiv:2010.05693v1 [cs.DC] Oct. 9, 2020.

Higuchi et al., "How to Keep a Vehicular Micro Cloud Intact," 2018 IEEE 87th Vehicular Technology Conference (VTC Spring) (pp. 1-5). IEEE.

Gona, R., "Application of Micro Cloud for Cooperative Vehicles," Southern Illinois University Carbondale, Thesis by Rishitha Gona (Abstract) (2020).

Wi-Fi Alliance, "Wi-Fi Peer-to-Peer (P2P) Technical Specification Version 1.7," 201 pages, 2016.

* cited by examiner

SYSTEM AND METHOD FOR IMPLEMENTING PEER-TO-PEER WIRELESS GROUPS FOR VEHICULAR MICRO CLOUDS

TECHNICAL FIELD

The subject matter described herein relates, in general, to systems and methods for implementing peer-to-peer (P2P) wireless groups, such as groups that communicates using Wi-Fi Direct, for vehicular micro clouds.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles can communicate with each other using a number of different methodologies, such as Dedicated Short-Range Communications (DSRC) and Cellular Vehicle-to-Everything (C-V2X). The use of these communication methodologies allows vehicles to form a vehicular micro cloud. Vehicular micro clouds allow members to collaborate to perform computation, data storage, communication, and sensing tasks.

Wi-Fi Direct, sometimes referred to as Wi-Fi Peer-to-Peer, is a Wi-Fi standard for P2P wireless connections that allows devices to establish a direct Wi-Fi connection without an intermediary wireless access point, router, or Internet connection. Wi-Fi Direct is a single-hop communication, rather than a multi-hop communication like wireless ad hoc networks. However, implementing P2P wireless networks, like Wi-Fi Direct, to form vehicular micro clouds have numerous challenges, such as prohibitions regarding communications between different groups, dissolution of the group upon the group owner leaving, latency caused during group dissolution/discovery, and communication/computational bottlenecks caused by limitations of the group owner.

SUMMARY

This section generally summarizes the disclosure and does not comprehensively explain its full scope or all its features.

In one example, a system includes a processor and a memory in communication with the processor having a group coordination service module and/or a data forwarding service module. The group coordination service module has instructions that, when executed by the processor, cause the processor to select a vehicle out of a plurality of vehicles to act as a group owner of a P2P wireless group operating as a vehicular micro cloud based on vehicle status information from the plurality of vehicles and transmit group configurations of the P2P wireless group to the plurality of vehicles to allow the plurality of vehicles to join the P2P wireless group. The selection of the vehicle may be based on how long the vehicle is predicted to be a member of the vehicular micro cloud.

The data forwarding service module may have instructions that, when executed by the processor, cause the processor to forward data transmitted from a member of the P2P wireless group to another vehicle that is not a member of the P2P wireless group and vice versa.

In another example, a method performed by a remote server includes the steps of selecting a vehicle out of a plurality of vehicles to act as a group owner of a P2P wireless group operating as a vehicular micro cloud based on vehicle status information from the plurality of vehicles and transmitting group configurations of the P2P wireless group to the plurality of vehicles to allow the plurality of vehicles to join the P2P wireless group. Like before, the selection of the vehicle may be based on how long the vehicle is predicted to be a member of the vehicular micro cloud. The method may also include the step of forwarding data transmitted from a member of the P2P wireless group to another vehicle that is not a member of the P2P wireless group via the remote server.

In yet another example, a non-transitory computer-readable medium having instructions that, when executed by a processor of a remote server, cause the processor to select a vehicle out of a plurality of vehicles to act as a group owner of a P2P wireless group operating as a vehicular micro cloud based on vehicle status information from the plurality of vehicles and transmit group configurations of the first P2P wireless group to the plurality of vehicles to allow the plurality of vehicles to join the first P2P wireless group. Again, the selection of the vehicle may be based on how long the vehicle is predicted to be a member of the vehicular micro cloud. Like before, the non-transitory computer-readable medium may also include instructions that cause the processor of the remote server to forward data transmitted from a member of the P2P wireless group to another vehicle that is not a member of the P2P wireless group via the remote server.

Further areas of applicability and various methods of enhancing the disclosed technology will become apparent from the description provided. The description and specific examples in this summary are intended for illustration only and do not limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
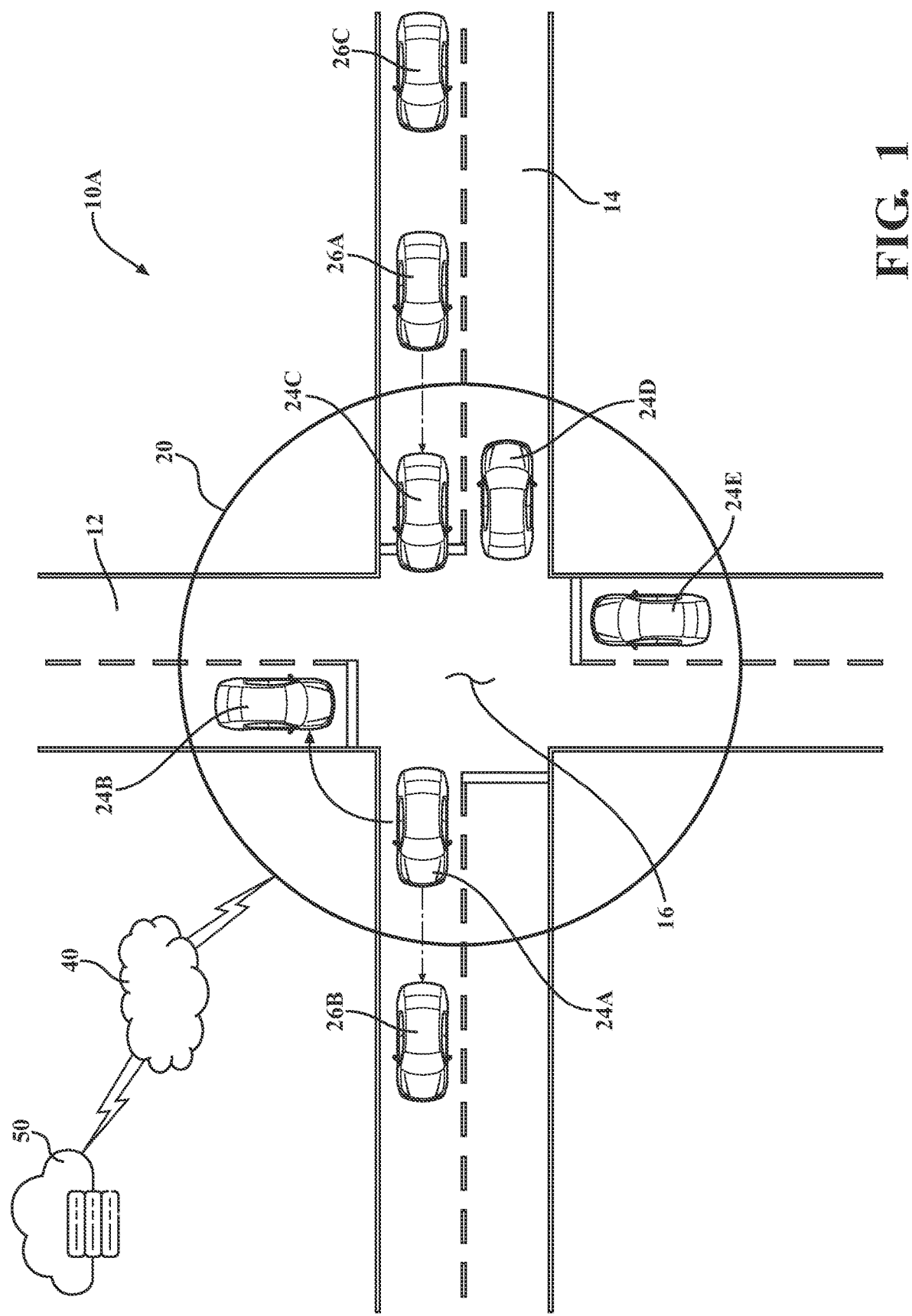
FIG. 1 illustrates an example of a stationary vehicular micro cloud that utilizes a P2P wireless group to form a vehicular micro cloud.

Described are a system and method that allows the formation of a vehicular micro cloud using a P2P wireless group, such as a Wi-Fi Direct wireless group, which minimizes or eliminates the drawbacks associated with using a P2P wireless group, such as prohibitions regarding communications between different groups, dissolution of the group upon the group owner leaving, latency caused during group discovery, and communication/computational bottlenecks caused by limitations of the group owner.

A remote server that may act as a system and execute the methodologies described in this description may provide group coordination services and data forwarding services to minimize or eliminate the drawbacks mentioned in the paragraph above. The remote server can communicate to vehicles that may form the vehicular micro cloud utilizing a different methodology from the P2P wireless group, such as C-V2X. Regarding group coordination services, the remote server can receive vehicle status information from a number of vehicles. Based on the vehicle status information, the remote server can select one of the vehicles to act as a group owner for the P2P wireless group. The selection of the vehicle to act as group owner may be the vehicle that is predicted to be located within the vehicular micro cloud longest, but other or additional factors can also be considered. By selecting a vehicle to act as a group owner that is predicted to be located within the vehicular micro cloud longest, disruptions caused by the group owner leaving the group can be minimized.

The remote server then sends group configurations of the P2P wireless group to the other vehicles to allow the other vehicles to join the P2P wireless group. By so doing, the time it takes to discover the appropriate P2P wireless group can be minimized, thus minimizing latency.

If the group owner is predicted to leave the group, the remote server can select a new group owner that forms a new P2P wireless group before the original group owner leaves. Like before, the remote server then sends new group configuration information to the old P2P wireless group members, allowing the members of the old P2P wireless group to join the new P2P wireless group before the original group owner leaves. By so doing, disruptions caused by a group owner leaving the group are minimized.

The remote server can also provide data forwarding services that allow vehicles that are not part of the P2P wireless group to communicate with members of the P2P wireless group. Moreover, vehicles that are not part of the P2P wireless group can send information to a member of the P2P wireless group by first sending it to the remote server. The data forwarding services of the remote server can then forward this information to the member of the P2P wireless group. Similarly, the opposite is also true, wherein a member of the P2P wireless group can communicate with a non-member by first sending information to the remote server via the group owner, which then forwards this information to the nonmember.

Referring to FIG. 1, illustrated is one example of a scene 10A where a vehicular micro cloud 20 could be formed. In this example, the vehicular micro cloud 20 may be a static vehicular micro cloud formed at an intersection 16 where a first road 12 and a second road 14 intersect. The static location of the vehicular micro cloud 20 may vary, and it should be understood that the vehicular micro cloud 20 can be located in a number of different locations and not necessarily those of intersections, such as the intersection 16. The vehicular micro cloud 20 can essentially act as a virtual edge server that offers data processing, storage, and/or communication services to members of the vehicular micro cloud 20.

The vehicular micro cloud 20 can include numerous members. In this example, the vehicular micro cloud 20 includes vehicles 24A-24E as members. As vehicles enter or leave the proximity of the intersection 16, vehicles may join or exit the vehicular micro cloud 20. Additionally, the scene 10A also includes nonmember vehicles 26A and 26B. In one example, the nonmember vehicle 26A, as it approaches the vehicular micro cloud 20, may join the vehicular micro cloud 20 when within an appropriate range of the vehicular micro cloud 20. Conversely, the vehicle 24A, which is a member of the vehicular micro cloud 20, as it leaves the intersection 16 is exiting the vehicular micro cloud 20. Therefore, it should be understood that vehicles are continuously joining and leaving the vehicular micro cloud 20.

The vehicular micro cloud 20 can communicate via a network 40 with a remote server 50, which, as will be explained later, provides group coordination services and/or data forwarding services to the vehicular micro cloud 20 and its member vehicles 24A-24C. The vehicular micro cloud 20 may utilize a P2P wireless communication protocol, such as Wi-Fi Direct. It should be understood that other types of P2P wireless communication protocols can also be utilized, and not just Wi-Fi Direct.

One or more of the member vehicles 24A-24C, such as the vehicle 24A, which acts as a group owner, may communicate with the remote server 50 via the network 40 using a cellular interface. As such, the communication between the vehicular micro cloud 20 and the remote server 50 may use one type of communication methodology. In contrast, the communication between members of the vehicular micro cloud 20 uses a different type of communication methodology, such as Wi-Fi Direct.

Wi-Fi Direct is a Wi-Fi standard for peer-to-peer wireless connections that allows devices to establish a direct Wi-Fi connection without an intermediary wireless access point, router, or Internet connection. One advantage of Wi-Fi Direct is the ability to connect devices even if they are from different manufacturers. Only one of the Wi-Fi devices needs to be compliant with Wi-Fi Direct to establish a peer-to-peer connection that transfers data directly between them with a greatly reduced setup. However, Wi-Fi Direct also has certain drawbacks. For example, Wi-Fi Direct prohibits communications between different Wi-Fi Direct groups. Additionally, if a group owner leaves the Wi-Fi Direct group, the group will be dissolved. Members of the dissolved group would need to connect to another group, which causes latency issues due to group discovery and interrupts communications as the dissolved Wi-Fi Direct group members cannot communicate with each other until they join another group.

In the example shown in FIG. 1, the vehicle 24A acts as a group owner of the vehicular micro cloud 20. When the vehicle 24A leaves the vehicular micro cloud 20, the P2P wireless group, using a Wi-Fi Direct protocol, dissolves. As will be explained later in this description, before the vehicle 24A leaves the vehicular micro cloud 20, the group coordination services provided by the remote server 50 cause the selection of a new group owner, in this case, vehicle 24B, that forms a new P2P wireless group. The remote server 50 sends group configuration information to the other members of the vehicular micro cloud 20, such as vehicles 24C-24E, so that vehicles 24C-24E, can join the newly formed group. By so doing, latency and discovery issues are significantly reduced and/or eliminated.

Figure 2:
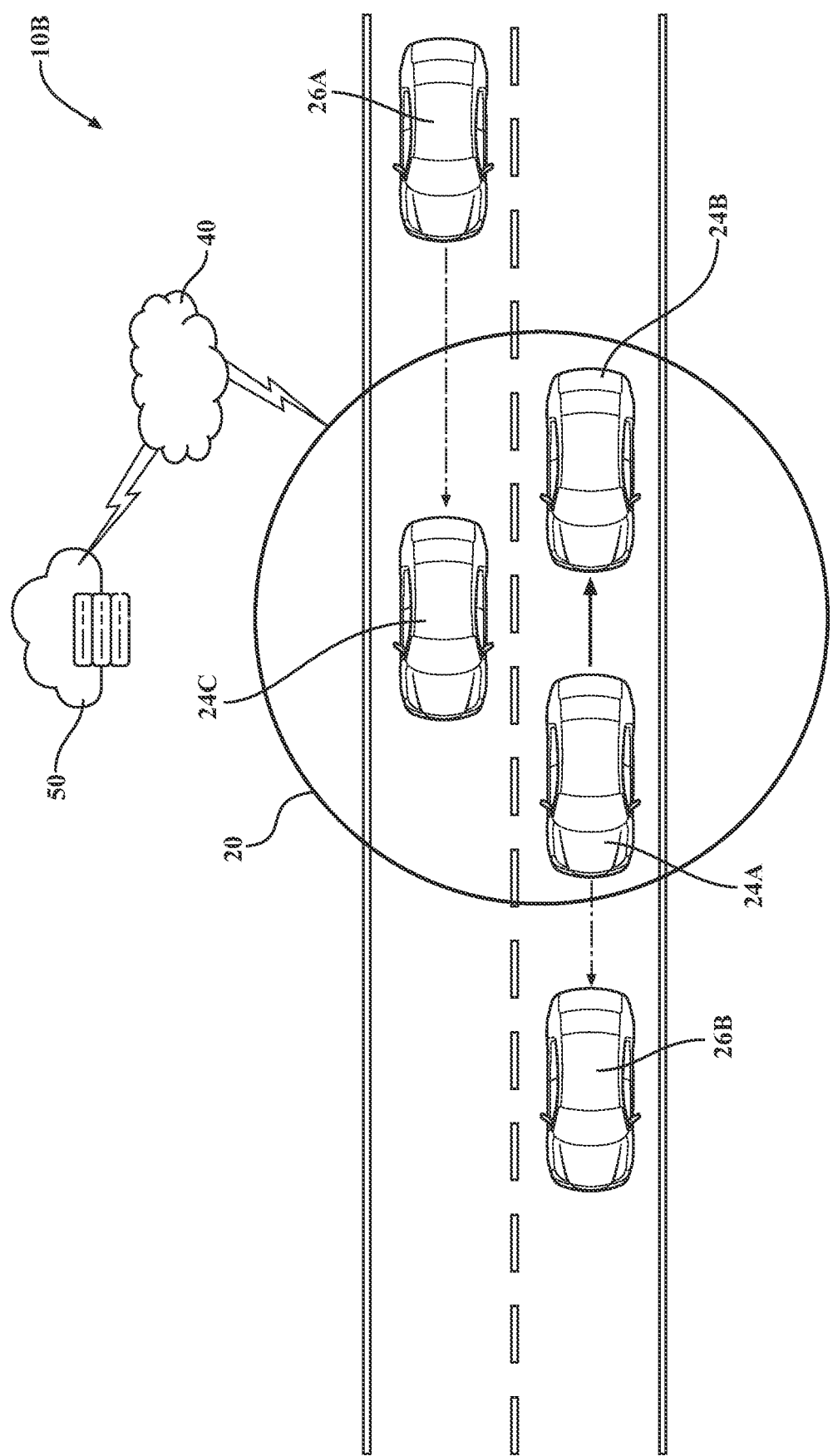
FIG. 2 illustrates an example of a moving vehicular micro cloud that utilizes a P2P wireless group to form a vehicular micro cloud.

While the vehicular micro cloud 20 may be a static vehicular micro cloud that is generally formed at a location, such as the intersection 16, it should be equally understood that the vehicular micro cloud 20 may also be a moving vehicular micro cloud. For example, FIG. 2 illustrates a scene 10B, wherein the vehicular micro cloud 20 is a moving vehicular micro cloud. Like reference numerals have been utilized to refer to like elements.

Here, like before, the vehicular micro cloud 20 is a P2P wireless group operating as the vehicular micro cloud 20. Like before, the P2P wireless group may utilize a P2P wireless group communication protocol, such as Wi-Fi Direct. Vehicles may join or leave the vehicular micro cloud 20 as they enter and exit the approximate location of the vehicular micro cloud 20 as it moves. If, for example, the vehicle 24A, acting as the group owner of the vehicular micro cloud 20, leaves the vehicular micro cloud 20, the group coordination services provided by the remote server 50 will select a new group owner, such as the vehicle 24B, which will then form a new P2P wireless group and the remote server 50 will provide the appropriate group configurations to other vehicles so that they can join the new group formed by the vehicle 24B.

Figure 3:
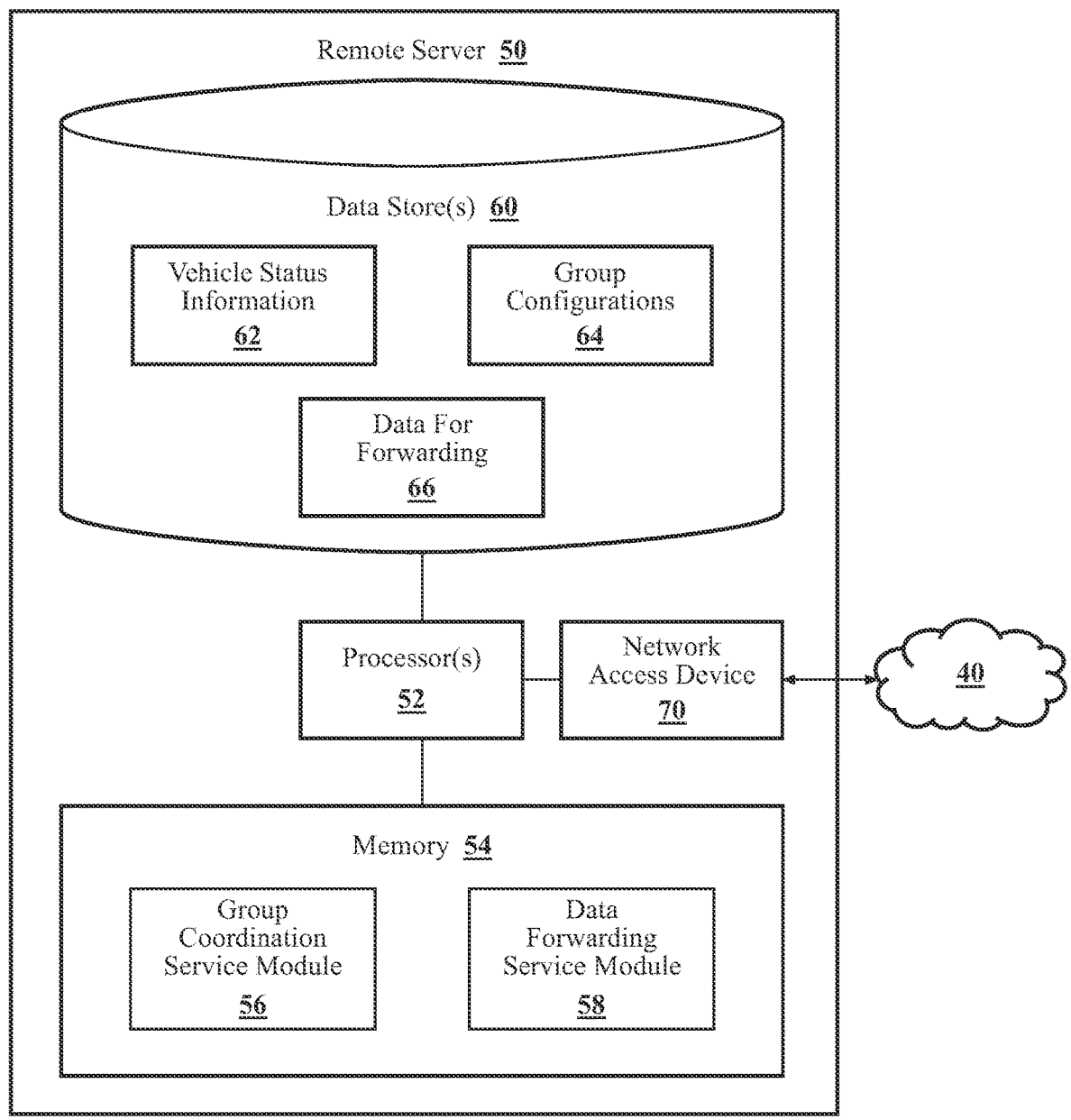
FIG. 3 illustrates one example of a remote server that provides group coordination services and data forwarding services to allow the formation of a vehicular micro cloud that utilizes a P2P wireless group.

Referring to FIG. 3, a more detailed view of the remote server 50 is shown. The remote server 50 may be one or more physical servers or a cloud server running in a cloud computing environment. The remote server includes one or more processor(s) 52. The one or more processor(s) 52 may be part of the remote server 50 or accessed through a data bus or another communication path. In one or more embodiments, the processor(s) 52 is an application-specific integrated circuit that is configured to implement functions associated with a group coordination service module 56 and/or a data forwarding service module 58. In general, the processor(s) 52 is an electronic processor such as a microprocessor that is capable of performing various functions as described herein.

The remote server 50 may also include a memory 54 that stores the group coordination service module 56 and the data forwarding service module 58. As will be explained later, the group coordination service module 56 causes the processor(s) 52 to provide group coordination services, while the data forwarding service module 58 causes the processor(s) 52 to provide data forwarding services. The memory 54 may be a random-access memory (RAM), read-only memory (ROM), a hard disk drive, a flash memory, or other suitable memory for storing the group coordination service module 56 and/or the data forwarding service module 58. The group coordination service module 56 and/or the data forwarding service module 58 are, for example, computer-readable instructions that, when executed by the processor(s) 52, cause the processor(s) 52 to perform the various functions disclosed herein.

Furthermore, in one example, the remote server 50 includes one or more data store(s) 60. The data store(s) 60 is, in one embodiment, an electronic data structure such as a database that is stored in the memory 54 or another memory and that is configured with routines that can be executed by the processor(s) 52 for analyzing stored data, providing stored data, generating stored data, organizing stored data, and so on. Thus, in one embodiment, the data store(s) 60 stores data used by the group coordination service module 56 and/or the data forwarding service module 58 in executing various functions. In one embodiment, the data store(s) 60 includes vehicle status information 62 provided from different vehicles, group configurations 64 related to joining a particular P2P wireless group, and/or data for forwarding 66 that can be data that needs to be forwarded by the remote server 50 to a vehicle. Detailed descriptions of this data will be given later in this description when describing the group coordination services and data forwarding services provided by the remote server 50.

In communication with the processor(s) 52 is a network access device 70. The network access device 70 can include hardware and/or software capable of connecting the remote server 50 to a preferred network, such as the network 40. The network access device 70 can include any one of a number of different pieces of hardware or software, such as routers, modems, monitored power supplies, wireless access points, Ethernet switches, etc. Again, the purpose of the network access device 70 is to allow the processor(s) 52, and therefore the remote server 50, to communicate with external devices via one or more networks.

Figure 4:
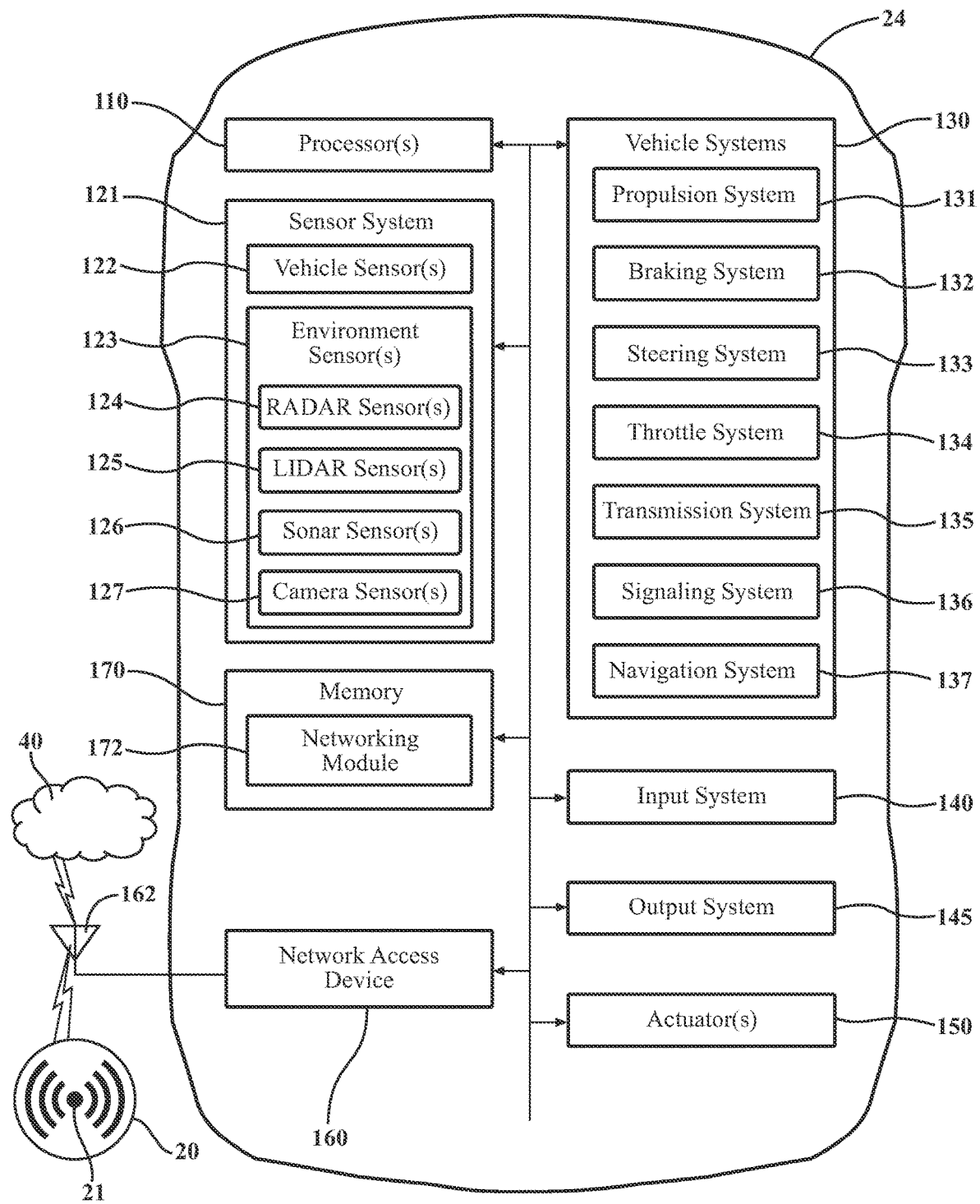
FIG. 4 illustrates one example of a vehicle that may act as a member of a P2P wireless group that forms a vehicular micro cloud.

Before explaining the group coordination services and the data forwarding services provided by the remote server, a brief description of the vehicles 24A-24C that are members of the vehicular micro cloud 20 will be provided. The description given regarding the vehicles 24A-24C may be equally applicable to nonmembers of the vehicular micro cloud 20, such as vehicles 26A-26C. Referring to FIG. 4, an example of a vehicle 24 that may act as a member of the vehicular micro cloud 20 is shown. As used herein, a "vehicle" is any form of powered transport. In one or more implementations, the vehicle 24 is an automobile. While arrangements will be described herein with respect to automobiles, it will be understood that embodiments are not limited to automobiles. In some implementations, the vehicle 24 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control.

The vehicle 24 also includes various elements. In various embodiments, it will be understood that it may not be necessary for the vehicle 24 to have all of the elements shown in FIG. 4. The vehicle 24 can have any combination of the various elements shown in FIG. 4. Further, the vehicle 24 can have additional elements to those shown in FIG. 4. In some arrangements, the vehicle 24 may be implemented without one or more of the elements shown in FIG. 4. While the various elements are shown as being located within the vehicle 24 in FIG. 4, it will be understood that one or more of these elements can be located external to the vehicle 24.

Further, the elements shown may be physically separated by large distances and provided as remote services (e.g., cloud-computing services).

Some of the possible elements of the vehicle 24 are shown in FIG. 4 and will be described along with subsequent figures. However, a description of many of the elements in FIG. 4 will be provided after the discussion of FIGS. 5-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

The vehicle 24 can include one or more processor(s) 110 that can communicate and process information from one or more vehicle systems and subsystems. Like the processor(s) 52 of the remote server 50, the processor(s) 110 can be a single processor can be multiple processors working in concert. The processor(s) 110 can be in communication and provide computational support to one or more vehicle systems, such as a sensor system 121 that relates to different vehicle sensors, vehicle systems 130 that relate to one or more systems that relate to actions performed by the vehicle 24, such as the movement of the vehicle 24, an input system 140, an output system 145, and one or more actuator(s) 150. Again, a detailed description of these items will be provided after the discussion of FIGS. 5-9 for purposes of brevity.

In addition, the vehicle 24 may include a network access device 160. The network access device 160 may include hardware and/or software that allow the vehicle 24 to communicate with systems located outside the vehicle 24. In this example, the network access device 160 is in communication with an antenna 162 that allows the wireless transmission and reception of data from other networks. In one example, the network access device 160 may communicate with the network 40 of FIG. 1, and any systems or subsystems that are in communication with the network 40, such as the remote server 50, provide group coordination services and data forwarding services.

In addition, the network access device 160 may be able to communicate with the vehicular micro cloud 20. A stated before, the vehicular micro cloud 20 may utilize a wireless P2P communication protocol to form a P2P wireless group 21, such as a group that communicates using Wi-Fi Direct. It should be understood that the vehicle 24 may have the ability to communicate with the network 40 and the vehicular micro cloud 20, but, in some cases, the vehicle 24 may only be able to communicate with the vehicular micro cloud 20. In those types of cases, the group owner of the vehicular micro cloud 20 would act as the conduit for communicating with the network 40 and the remote server 50.

The coordination of communicating with the network 40 and/or the vehicular micro cloud 20 may be performed by the processor(s) 110 based on instructions located within the networking module 172, which may be stored within a memory. The instructions of the networking module 172 may cause the network access device to perform the appropriate configurations to communicate with the network 40 and/or the P2P wireless group 21 that forms the vehicular micro cloud 20. The memory 170 may be any memory capable of storing the networking module 172, such as RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

Figure 5:
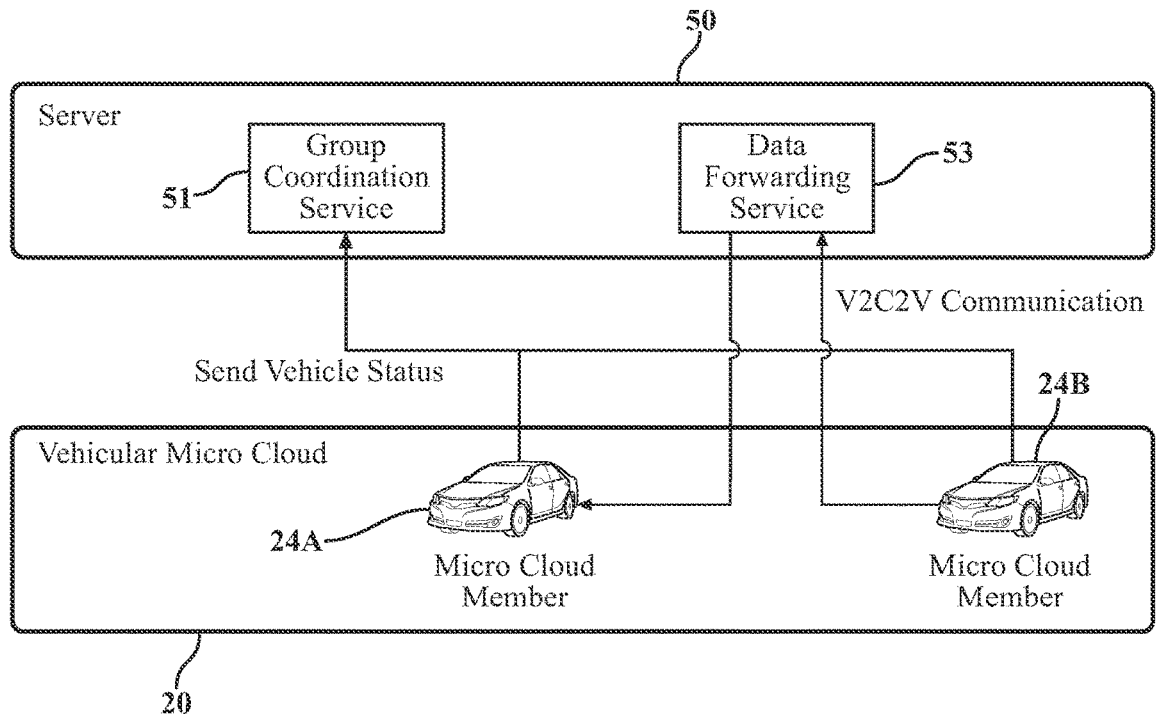
FIG. 5 illustrates an example of a process flow for forwarding data using a data forwarding service of a remote server.

Turning attention to FIG. 5, illustrated is a process flow illustrating the data forwarding service 53 provided by the data forwarding service module 58 of FIG. 3. Moreover, the data forwarding service module 58 can configure the processor(s) 52 of the remote server 50 to provide data forwarding services between vehicles 24A and 24B of the vehicular micro cloud 20. Here, in a situation where the vehicle 24A and the vehicle 24B cannot communicate with each other via a P2P wireless group, such as a group that communicates using Wi-Fi Direct, one vehicle, such as the vehicle 24B, may send data to be communicated to the other vehicle 24A by sending it to the remote server 50. This may be achieved by communicating with the remote server using a cellular communication methodology such as Vehicle-to-Cloud-to-Vehicle (V2C2V). However, any suitable communication methodology can be utilized.

The data received from the vehicle 24B can be temporarily stored in the data for forwarding 66 of the data store(s) 60 of FIG. 3. From there, the data forwarding service module 58 can configure the processor(s) 52 of the remote server 50 to then transmit using a cellular communication methodology the data received from the vehicle 24B to the other vehicle 24A. As such, data can be forwarded from one vehicular cloud member to another vehicular cloud member using a cellular communication link and data forwarding service 53 provided by the remote server 50. This may be useful in situations where the vehicle 24B cannot join a P2P wireless group or is in the process of joining another P2P wireless group, thus preventing an interruption in communication between members of the same vehicular micro cloud.

Figure 6:
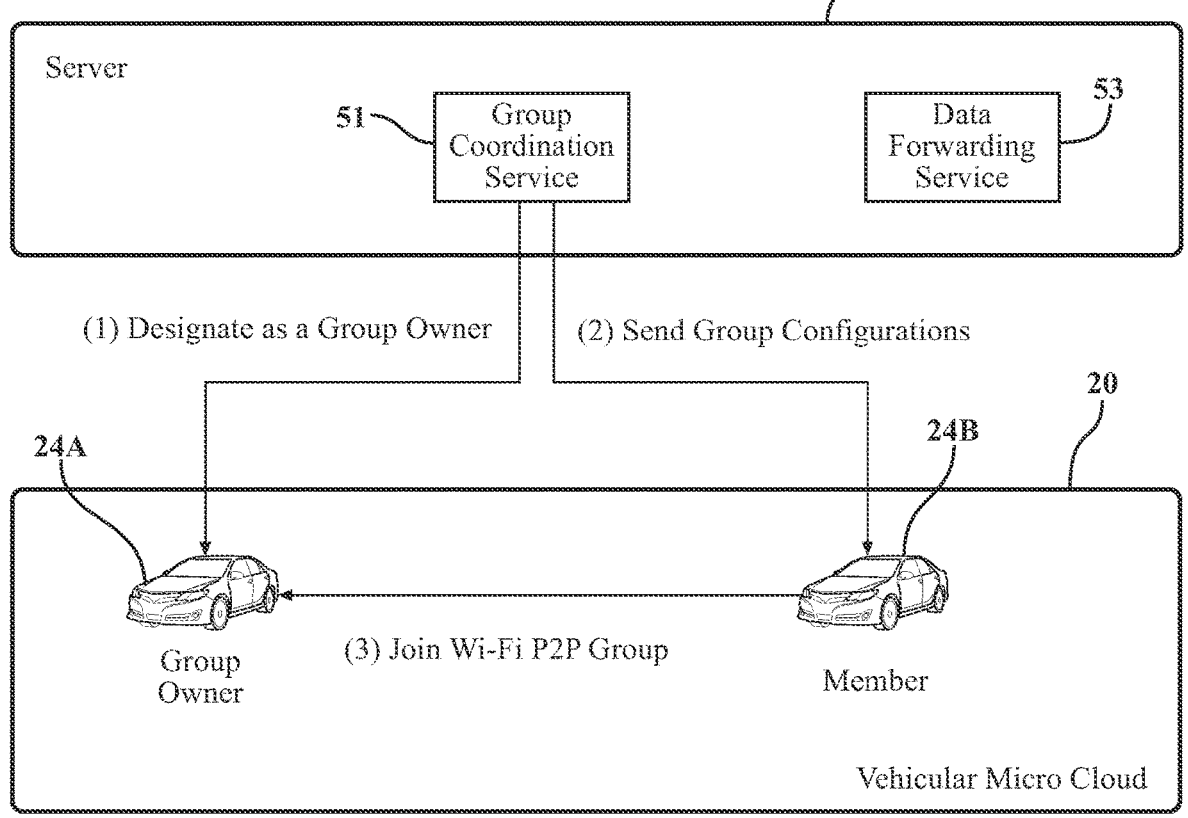
FIG. 6 illustrates an example of a process flow illustrating the formation of a P2P group that forms a vehicular micro cloud.
Figure 7:
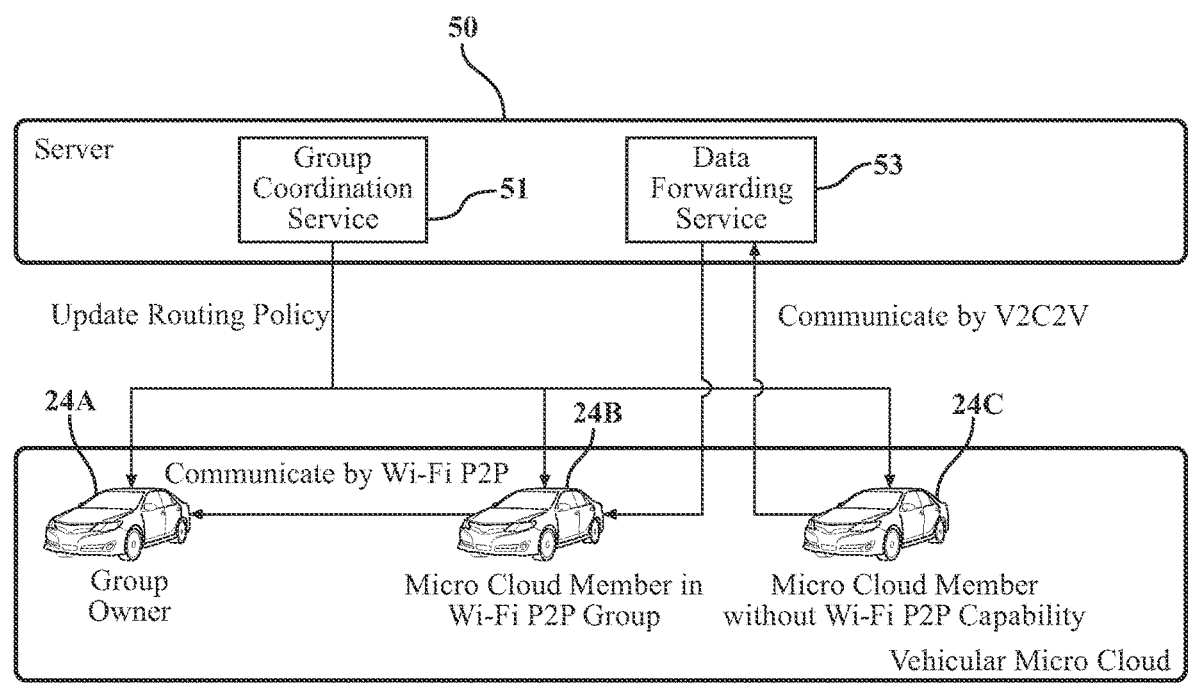
FIG. 7 illustrates an example of a process flow for generating a routing policy that dictates how members of the vehicular micro cloud communicate to other members.

Referring to FIG. 6, illustrated is a process flow showing how the group coordination service 51 provided by the remote server 50 is utilized to form a P2P wireless group that acts as the vehicular micro cloud 20 and the process of selecting the appropriate group owner of the P2P wireless group. Here, the group coordination service module 56 of FIG. 3 includes instructions that, when executed by the processor(s) 52, causes the processor(s) 52 to receive vehicle status information from one or more vehicles, such as the vehicles 24A and 24B. The vehicle status information can include one or more of vehicle computational performance, vehicle communication performance, vehicle position, vehicle speed, vehicular micro cloud membership information, P2P wireless group membership information, vehicle destination information, and vehicle route information.

Next, the group coordination service module 56 of FIG. 3 includes instructions that, when executed by the processor(s) 52, causes the processor(s) 52 to select one of the vehicles to act as a group owner of a P2P wireless group operating as the vehicular micro cloud 20 based on the vehicle status information. In some cases, the selection for the group owner by the remote server 50 may be based on evaluating the vehicle status information to determine which vehicle is most likely to stay within the vehicular micro cloud 20 for the longest period of time. By selecting the vehicle as the group owner is predicted to be within the vehicular micro cloud 20 for the longest period of time, interruptions caused when the group owner leaves the P2P wireless group that forms the vehicular micro cloud 20 can be avoided. Of course, other factors may play a role as well. For example, if several vehicles are being evaluated and the vehicle that is predicted to stay the longest within the vehicular micro cloud 20 has poor computation and/or communication capabilities, another vehicle that may stay slightly less long but has better computational and/or communication capabilities may be selected instead.

Such a centralized group owner selection is in contrast to traditional Wi-Fi Direct, where a group owner is decided in a fully distributed manner. By the centralized coordination provided by the group coordination service 51 of the remote server 50, the system can guarantee that only one vehicular micro cloud member becomes the group owner and all the micro cloud members belong to the same P2P wireless group.

The determination regarding which vehicle is most likely to stay within the vehicular micro cloud 20 can include a number of different factors. For example, the vehicle status information could include route information indicating where the vehicle is traveling to or from. In some cases, the vehicle may have reached its destination and is parked, thus indicating that the vehicle may be located within the vehicular micro cloud 20 for an extended period of time. In other cases, as the vehicular micro cloud 20 is a moving vehicular micro cloud, such as shown in FIG. 2, route information can be utilized to determine how long a particular vehicle is likely to stay within the vehicular micro cloud 20. Again, a number of different methodologies can be utilized to predict how long and even when a particular vehicle is likely to leave a particular vehicular micro cloud.

Once a vehicle has been selected as the group owner, the group coordination service module 56 causes the processor(s) 52 to transmit to the vehicles that form the vehicular micro cloud 20 group configuration information regarding the P2P wireless group that will form the vehicular micro cloud 20. The transmission of the group configuration information may be performed using a cellular methodology. The group configuration information may be stored within the group configuration 64 of the data store(s) 60. The group configuration information includes information needed to join the P2P wireless group, such as group ID, wireless channel, security credentials, etc.

In the example shown in FIG. 6, the vehicle 24A was selected as the group owner for the P2P wireless group that forms the vehicular micro cloud 20. Group configurations to join the P2P wireless group that the vehicle 24A is acting as group owner are sent to other vehicles to join the P2P wireless group more rapidly. By providing group configuration information from the remote server 50 to other vehicles, these vehicles can avoid the time-consuming step of discovering the P2P wireless group that forms the vehicular micro cloud 20.

Moreover, when using Wi-Fi Direct to form a particular group, peers must perform device discovery, and optional service discovery defined other peers in the vicinity and services offered by them. This traditionally occurs by having the group owner advertise the group configurations over P2P channels so that interested peers can join its group. However, the device discovery and the service discovery often incur a considerable latency because discovering devices must scan multiple wireless channels to ensure all the devices and groups are detected. By disseminating the group configuration information to the members from the remote server 50 using a cellular communication methodology, members can immediately join the P2P wireless group of interest and avoiding the time-consuming device discovery and service discovery procedure.

There may be situations where the group owner, such as the vehicle 24A, may need to leave the group. This can occur when the vehicle 24A leaves the geographic location where the vehicular micro cloud 20 is centered upon (FIG. 1) or the geographic location of the moving vehicular micro cloud 20 (FIG. 2). When a group owner leaves a P2P wireless group acting as a vehicular micro cloud, the P2P wireless group will cease to exist. This results in a situation where members of the vehicular micro cloud 20 cannot communicate with each other and cannot partake in services provided by the vehicular micro cloud 20.

The group coordination service 51 provided by the remote server 50 can avoid or minimize communication disruptions that normally occur when a group owner leaves a particular group. Here, the group coordination service module 56 includes instructions that, when executed by the processor(s) 52, cause the processor(s) 52 to predict a predicted leaving time indicting when the group owner will leave the vehicular micro cloud 20. In the example shown in FIG. 6, the processor(s) 52 will determine a predicted leaving time indicating when the vehicle 24A will leave the vehicular micro cloud 20.

Next, the group coordination service module 56 includes instructions that, when executed by the processor(s) 52, cause the processor(s) 52 to select another vehicle from the plurality of vehicles to act as a new group owner of a new P2P wireless group before the predicted leaving time of the first group owner expires. The selection methodology of the new group owner may be similar to the selection methodology employed with selecting the original group owner. Namely, the group coordination service module 56 causes the processor(s) 52 to receive vehicle status information from vehicles that are part of the soon to be dissolved P2P wireless group. Like before, the group coordination service module 56 includes instructions that, when executed by the processor(s) 52, cause the processor(s) 52 may utilize this information to predict how long a particular vehicle is likely to be part of the new P2P wireless group. Of course, instead of utilizing the length of time a particular vehicle is likely to be part of the new P2P wireless group, other factors can also be utilized in selecting the new group owner, such as the computational/communication performance of a particular vehicle.

After that, the group coordination service module 56 includes instructions that, when executed by the processor(s) 52, cause the processor(s) 52 to transmit group configurations of the newly formed P2P wireless group to member vehicles of the old P2P wireless group to allow the vehicles to join the new P2P wireless group before the predicted leaving time of the old group owner.

Essentially, this prediction of when a particular group owner will leave a P2P wireless group allows the remote server 50 and the group coordination service 51 to pick a new group owner that forms a new P2P wireless group. Before the old P2P wireless group is dissolved, members of the old P2P wireless group receive group configuration information allowing them to rapidly join the new P2P wireless group before the dissolution of the old P2P wireless group. This results in a situation where interruptions regarding communications and other services provided by the vehicular micro cloud 20 are minimized, as the new P2P wireless group forms the vehicular micro cloud 20.

During the forming and joining of the new P2P wireless group, there may be situations where communications between vehicles are interrupted, as some vehicles have joined the new P2P wireless group while other vehicles are still part of the old P2P wireless group. When this situation occurs, the group coordination service 51 of the remote server 50 can receive these communications and make sure they are forwarded to the appropriate member of the other P2P wireless group. This avoids interruption of communication between vehicles of two different P2P wireless groups during this transition. Essentially, any data traffic sent from one P2P wireless group member to a member of the other P2P wireless group is forwarded via a cellular communication link provided by the remote server 50 to ensure that all micro cloud members remain connected during this handover process. This may occur by updating the routing policy that the group coordination service 51 disseminates to micro cloud members.

Once members of the old P2P group have joined the new P2P group with the new group owner, the group coordination service module 56 includes instructions that, when executed by the processor(s) 52, cause the processor(s) 52 to transmit instructions to the old group owner to dissolve the old P2P wireless group.

The group coordination service 51 provided by the remote server 50 can also control how different micro cloud members of the vehicular micro cloud 20 send data messages to other members. Here, the group coordination service module 56 may cause the processor(s) 52 to generate a routing policy. In one example, shown in the process flow of FIG. 7, the routing policy may include the following:

(1) if both the sender and recipient vehicle belong to the same P2P wireless group, the sender vehicle sends data to the recipient vehicle using the communication protocol of the P2P wireless group, such as a group that communicates using Wi-Fi Direct, and (2) if either the sender or recipient vehicle does not belong to the same P2P wireless group, for example, due to the lack of a P2P wireless group capable communication device, or if data transmission over the communication protocol of the P2P wireless group fails, the sender vehicle may send the data using a cellular communication methodology, such as V2C2V.

Of course, it should be understood that the routing policy can include additional or different routing policies and not just those specifically mentioned in the paragraph above. The routing policy May be regularly updated as the micro cloud membership or Wi-Fi P2P group membership changes and sent to micro cloud members.

In some embodiments, the group coordination service 51 may use more advanced routing policies. For example, a pair of micro cloud members in the P2P wireless group may send data messages over V2C2V communications if the load on the P2P wireless group falls below a threshold. The threshold may be based on one or more performance metrics of the P2P wireless group, such as latency, packet loss indicators, jitter, bandwidth, and throughput. In some other embodiments, the group coordination service 51 may use machine learning, optimization, and other algorithms to intelligently adjust the routing policies for better performance.

Figure 8:
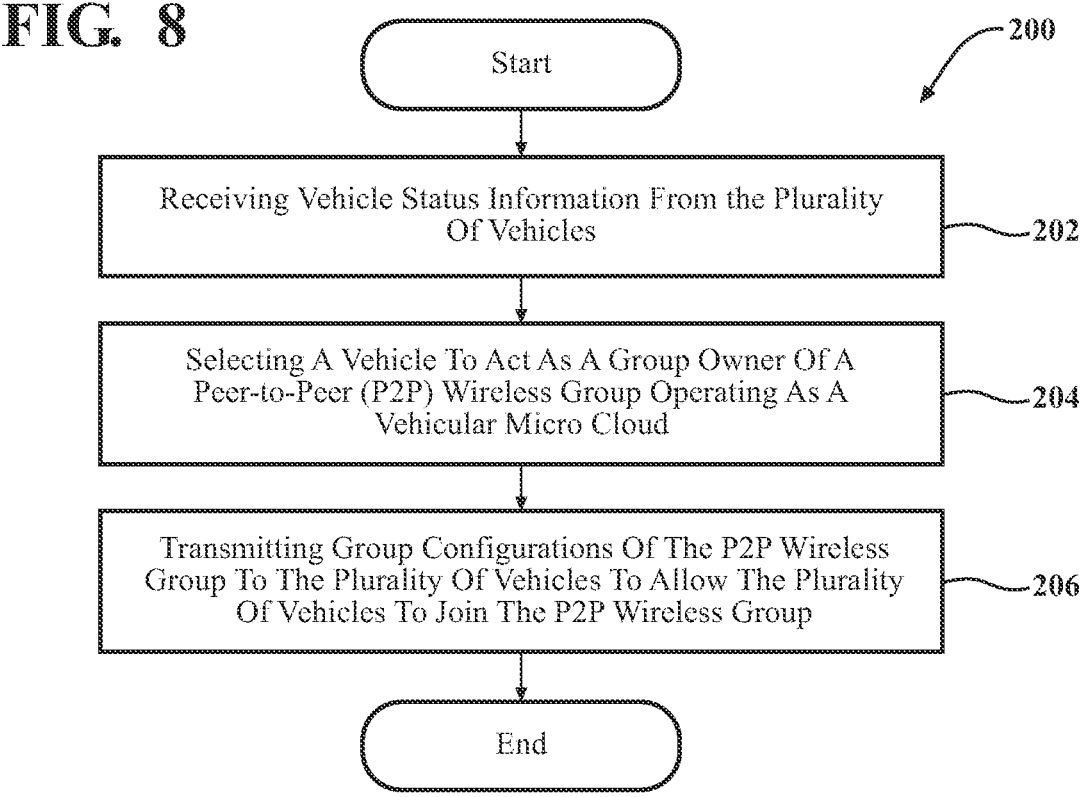
FIG. 8 illustrates a method for selecting the group owner of a P2P wireless group that acts as a vehicular micro cloud.

Referring to FIG. 8, a method 200 for selecting a vehicle to be a group owner of a P2P wireless group that forms a vehicular micro cloud is shown. The method 200 will be described from the viewpoint of the vehicles 24A-24E and 26A-26C of FIG. 1 and the remote server 50 of FIG. 3. However, it should be understood that this is just one example of implementing the method 200. While method 200 is discussed in combination with the remote server 50, it should be appreciated that the method 200 is not limited to being implemented within the remote server 50 but is instead one example of a system that may implement the method 200.

In step 202, the group coordination service module 56 includes instructions that, when executed by the processor(s) 52, cause the processor(s) 52 to receive vehicle status information from one or more vehicles, such as the vehicles 24A-24E and 26A-26C. The vehicle status information can include one or more of vehicle computational performance, vehicle communication performance, vehicle position, vehicle speed, vehicular micro cloud membership information, P2P wireless group membership information, vehicle destination information, and vehicle route information.

In step 204, the group coordination service module 56 includes instructions that, when executed by the processor(s) 52, cause the processor(s) 52 to select one of the vehicles 24A-24E and 26A-26C to act as a group owner of a P2P wireless group operating as the vehicular micro cloud 20 based on the vehicle status information. In some cases, the selection for the group owner by the remote server 50 may be based on evaluating the vehicle status information to determine which vehicle is most likely to stay within the vehicular micro cloud 20 for the longest period of time. In this example, the group coordination service module 56 has caused the processor to select the vehicle 24A as the group owner of the vehicular micro cloud 20.

In step 206, the group coordination service module 56 causes the processor(s) 52 to transmit to the vehicles 24B-24E that form the vehicular micro cloud 20 group configuration information regarding the P2P wireless group that will form the vehicular micro cloud 20. The transmission of the group configuration information may be performed using a cellular methodology. The group configuration information may be stored within the group configuration 64 of the data store(s) 60. The group configuration information includes information needed to join the P2P wireless group, such as group ID, wireless channel, security credentials, etc.

Figure 9:
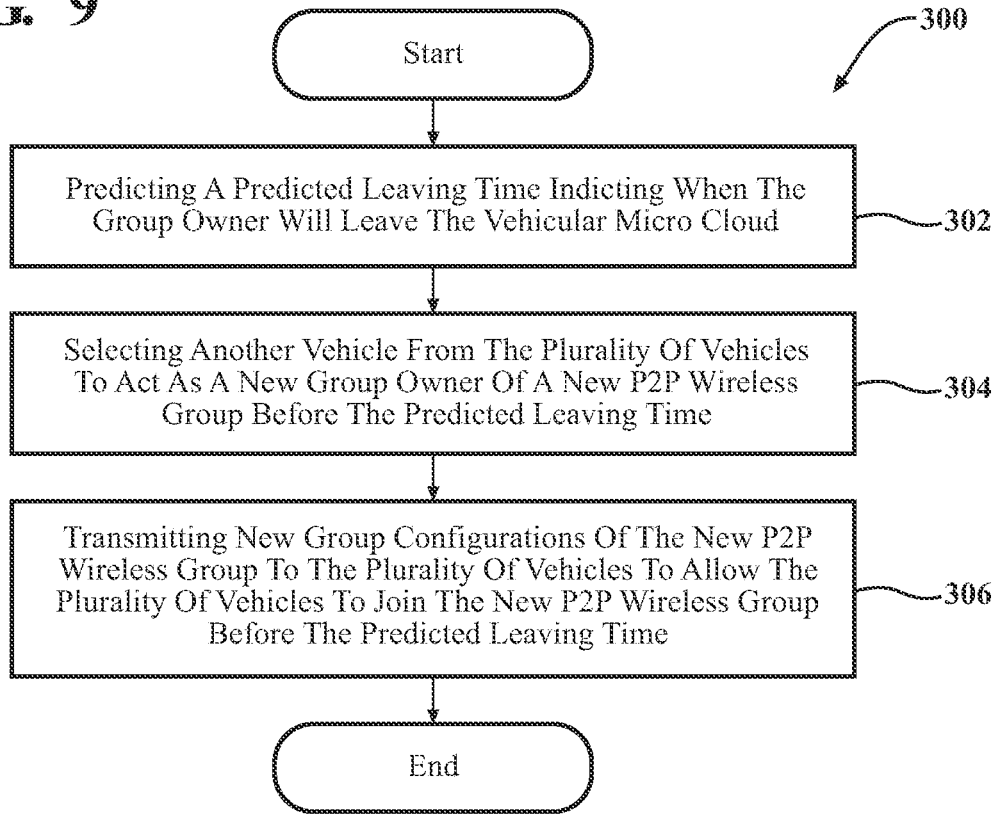
FIG. 9 illustrates a method for selecting a new group owner and forming a new P2P wireless group that acts as a vehicular micro cloud when a prior group owner of a prior P2P wireless group leaves the group.

As mentioned previously, there may be situations where the group owner, such as the vehicle 24A, may need to leave the group. This can occur when the vehicle 24A leaves the geographic location where the vehicular micro cloud 20 is centered upon. Reference is made to FIG. 9, which illustrates a method 300 for selecting a new group owner before the old group owner leaves the vehicular micro cloud 20, thus causing the P2P wireless group to dissolve Like before, the method 300 will be described from the viewpoint of the vehicles 24A-24E and 26A-26C of FIG. 1 and the remote server 50 of FIG. 3. However, it should be understood that this is just one example of implementing the method 300. While method 300 is discussed in combination with the remote server 50, it should be appreciated that the method 300 is not limited to being implemented within the remote server 50 but is instead one example of a system that may implement the method 300.

In this example, assume that the vehicle 24A will be leaving the vehicular micro cloud 20, thus requiring a new group owner to be chosen. In step 302, the group coordination service module 56 causes the processor(s) 52 to predict a predicted leaving time, indicating when the vehicle 24A, acting as the group owner, will leave the vehicular micro cloud 20. The calculation of the predicted leaving time can be based on vehicle status information from the vehicle 24A. For example, the vehicle status information could include information regarding route information indicating where and/or when the vehicle 24A will travel. Using this information, the group coordination service module 56 causes the processor(s) 52 to predict an approximate time when the vehicle 24A will be leaving the vehicular micro cloud 20.

In step 304, the group coordination service module 56 includes instructions that, when executed by the processor(s) 52, cause the processor(s) 52 to select another vehicle 24B-24E to act as a new group owner of a new P2P wireless group before the predicted leaving time of the vehicle 24A. The selection methodology of the new group owner may be similar to the selection methodology employed with selecting the original group owner. In this example, the group coordination service module 56 has caused the processor(s) 52 to select vehicle 24B as the new group owner. As such, the vehicle 24B is instructed to create a new P2P wireless group that will form the vehicular micro cloud 20.

In step 306, the group coordination service module 56 includes instructions that, when executed by the processor(s) 52, cause the processor(s) 52 to transmit group configurations of the newly formed P2P wireless group to vehicles 24C-24E of the old P2P wireless group to allow the vehicles 24C-24E to join the new P2P wireless group before the predicted leaving time of the vehicle 24A.

During this handover transition, there may be situations where one of the vehicles 24C-24E has become a member of the newly formed group, and another of the vehicles 24C-24E is still part of the old group. When this occurs, as explained previously, the group coordination service module 56 and/or the data forwarding service module 58 can cause the processor(s) 52 to receive these communications and make sure they are forwarded to the appropriate member of the other P2P wireless group. By so doing, communications between members will not be dropped or otherwise lost.

FIG. 4 will now be discussed in full detail as an example of the vehicle 24 that may be part of the vehicular micro cloud, such as the vehicular micro cloud 20. The vehicle 24 can be an autonomous, semi-autonomous, and/or non-autonomous vehicle and may have the ability to switch between different modes. As used herein, "autonomous vehicle" refers to a vehicle that operates in an autonomous mode. "Autonomous mode" refers to navigating and/or maneuvering the vehicle 24 along a travel route using one or more computing systems to control the vehicle 24 with minimal or no input from a human driver. In one or more embodiments, the vehicle 24 is highly automated or completely automated. In one embodiment, the vehicle 24 is configured with one or more semi-autonomous operational modes in which one or more computing systems perform a portion of the navigation and/or maneuvering of the vehicle 24 along a travel route, and a vehicle operator (i.e., driver) provides inputs to the vehicle to perform a portion of the navigation and/or maneuvering of the vehicle 24 along a travel route.

As noted above, the vehicle 24 can include the sensor system 121. The sensor system 121 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 121 includes a plurality of sensors, the sensors can work independently from each other. Alternatively, two or more of the sensors can work in combination with each other. In such a case, the two or more sensors can form a sensor network. The sensor system 121 and/or the one or more sensors can be operatively connected to the processor(s) 110 and/or another element of the vehicle 24. The sensor system 121 can acquire data of at least a portion of the external environment of the vehicle 24 (e.g., nearby vehicles).

The sensor system 121 can include any suitable type of sensor. Various examples of different types of sensors will be described herein. However, it will be understood that the embodiments are not limited to the particular sensors described. The sensor system 121 can include one or more vehicle sensor(s) 122. The vehicle sensor(s) 122 can detect, determine, and/or sense information about the vehicle 24 itself. In one or more arrangements, the vehicle sensor(s) 122 can be configured to detect, and/or sense position and orientation changes of the vehicle 24, such as, for example, based on inertial acceleration. In one or more arrangements, the vehicle sensor(s) 122 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 122 can be configured to detect, and/or sense one or more characteristics of the vehicle 24.

Alternatively, or in addition, the sensor system 121 can include one or more environment sensors 123 configured to acquire, and/or sense driving environment data. "Driving environment data" includes data or information about the external environment in which an autonomous vehicle is located or one or more portions thereof. For example, the one or more environment sensors 123 can be configured to detect, quantify and/or sense obstacles in at least a portion of the external environment of the vehicle 24 and/or information/data about such obstacles. Such obstacles may be stationary objects and/or dynamic objects. The one or more environment sensors 123 can be configured to detect, measure, quantify and/or sense other things in the external environment of the vehicle 24, such as, for example, lane markers, signs, traffic lights, traffic signs, lane lines, crosswalks, curbs proximate the vehicle 24, off-road objects, etc.

For example, in one or more arrangements, the environment sensors 123 can include one or more radar sensors 124, one or more LIDAR sensors 125, one or more sonar sensors 126, and/or more cameras 127. In one or more arrangements, the one or more cameras 127 can be high dynamic range (HDR) cameras or infrared (IR) cameras.

The vehicle 24 can include an input system 140. An "input system" includes any device, component, system, element or arrangement or groups thereof that enable information/data to be entered into a machine. The input system 140 can receive an input from a vehicle passenger (e.g., a driver or a passenger). Vehicle 24 can include an output system 145. An "output system" includes any device, component, or arrangement, or groups thereof that enable information/data to be presented to a vehicle passenger (e.g., a person, a vehicle passenger, etc.).

The vehicle 24 can include one or more vehicle systems 130. Various examples of the one or more vehicle systems 130 are shown in FIG. 4. However, the vehicle 24 can include more, fewer, or different vehicle systems. It should be appreciated that although particular vehicle systems are separately defined, each or any of the systems or portions thereof may be otherwise combined or segregated via hardware and/or software within the vehicle 24. The vehicle 24 can include a propulsion system 131, a braking system 132, a steering system 133, throttle system 134, a transmission system 135, a signaling system 136, and/or a navigation system 137. Each of these systems can include one or more devices, components, and/or a combination thereof, now known or later developed.

The navigation system 137 can include one or more devices, applications, and/or combinations thereof, now known or later developed, configured to determine the geographic location of the vehicle 24 and/or to determine a travel route for the vehicle 24. The navigation system 137 can include one or more mapping applications to determine a travel route for the vehicle 24. The navigation system 137 can include a global positioning system, a local positioning system, or a geolocation system.

The vehicle 24 can include one or more actuator(s) 150. The actuator(s) 150 can be any element or combination of elements operable to modify, adjust, and/or alter one or more of the vehicle systems 130 or components thereof to respond to receiving signals or other inputs from the processor(s) 110. Any suitable actuator can be used. For instance, the one or more actuator(s) 150 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. As used herein, the term "another" is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising steps of:
receiving, by a remote server, vehicle status information from a plurality of vehicles of a vehicular micro cloud;
determining, by the remote server and based on the vehicle status information, a predicted length of time for each of the plurality of vehicles, the predicted length of time indicating how long each of the plurality of vehicles will stay within the vehicular micro cloud;
selecting, by the remote server, a first vehicle out of the plurality of vehicles to act as a first group owner of a first peer-to-peer (P2P) wireless group operating as the vehicular micro cloud based on the vehicle status information from the plurality of vehicles, the first vehicle having a longest predicted length of time; and
transmitting, by the remote server, first group configurations of the first P2P wireless group to the plurality of vehicles to allow the plurality of vehicles to join the first P2P wireless group.

2. The method of claim 1, wherein the vehicle status information includes at least one of: vehicle computational performance, vehicle communication performance, vehicle position, vehicle speed, vehicular micro cloud membership information, P2P wireless group membership information, vehicle destination information, and vehicle route information.

3. The method of claim 1, wherein the remote server communicates with the plurality of vehicles using a cellular communication methodology, the cellular communication methodology being a different communication methodology than utilized by the first P2P wireless group.

4. The method of claim 1, wherein the first P2P wireless group utilizes a Wi-Fi Direct standard for P2P communications.

5. The method of claim 1, further comprising the steps of:
predicting, by the remote server, a predicted leaving time indicting when the first group owner will leave the vehicular micro cloud;
selecting, by the remote server, a second vehicle from the plurality of vehicles to act as a second group owner of a second P2P wireless group before the predicted leaving time; and
transmitting, by the remote server, second group configurations of the second P2P wireless group to the plurality of vehicles to allow the plurality of vehicles to join the second P2P wireless group before the predicted leaving time.

6. The method of claim 5, further comprising the step of forwarding, by the remote server, data transmitted from a member of the first P2P wireless group to a member of the second group and vice versa before the predicted leaving time.

7. The method of claim 1, further comprising the steps of:
determining, by the remote server, communication performance between the plurality of vehicles forming the vehicular micro cloud; and
providing, by the remote server, a secondary communication pathway between at least a portion of vehicles forming the vehicular micro cloud when a communication performance drops below a threshold.

8. A system comprising:
a processor; and
a memory in communication with the processor and having a group coordination service module having instructions that, when executed by the processor, cause the processor to:
receive vehicle status information from a plurality of vehicles of a vehicular micro cloud;
determine based on the vehicle status information, a predicted length of time for each of the plurality of vehicles, the predicted length of time indicating how long each of the plurality of vehicles will stay within the vehicular micro cloud;
select a first vehicle out of the plurality of vehicles to act as a first group owner of a first peer-to-peer (P2P) wireless group operating as the vehicular micro cloud based on the vehicle status information from the plurality of vehicles, the first vehicle having a longest predicted length of time, and
transmit first group configurations of the first P2P wireless group to the plurality of vehicles to allow the plurality of vehicles to join the first P2P wireless group.

9. The system of claim 8, wherein the vehicle status information includes at least one of: vehicle computational performance, vehicle communication performance, vehicle position, vehicle speed, vehicular micro cloud membership information, P2P wireless group membership information, vehicle destination information, and vehicle route information.

10. The system of claim 8, wherein the system communicates with the plurality of vehicles using a cellular communication methodology, the cellular communication methodology being a different communication methodology than utilized by the first P2P wireless group.

11. The system of claim 8, wherein the first P2P wireless group utilizes a Wi-Fi Direct standard for P2P communications.

12. The system of claim 8, wherein the group coordination service module further comprises instructions that, when executed by the processor, cause the processor to:
predict a predicted leaving time indicting when the first group owner will leave the vehicular micro cloud;
select a second vehicle from the plurality of vehicles to act as a second group owner of a second P2P wireless group before the predicted leaving time;
instruct the second vehicle to create the second P2P wireless group before the predicted leaving time; and
transmit second group configurations of the second P2P wireless group to the plurality of vehicles to allow the plurality of vehicles to join the second P2P wireless group before the predicted leaving time.

13. The system of claim 12, wherein the memory further comprises a data forwarding service module having instructions that, when executed by the processor, cause the processor to forward data transmitted from a member of the first P2P wireless group to a member of the second group and vice versa before the predicted leaving time.

14. The system of claim 8, wherein the group coordination service module further comprises instructions that, when executed by the processor, cause the processor to:
determine communication performance between the plurality of vehicles forming the vehicular micro cloud; and provide a secondary communication pathway between at least a portion of vehicles forming the vehicular micro cloud when a communication performance drops below a threshold.

15. A non-transitory computer-readable medium having instructions that, when executed by a processor, cause the processor to:
- receive vehicle status information from a plurality of vehicles of a vehicular micro cloud;
- determine based on the vehicle status information, a predicted length of time for each of the plurality of vehicles, the predicted length of time indicating how long each of the plurality of vehicles will stay within the vehicular micro cloud;
- select a first vehicle out of the plurality of vehicles to act as a first group owner of a first peer-to-peer (P2P) wireless group operating as the vehicular micro cloud based on the vehicle status information from the plurality of vehicles, the first vehicle having a longest predicted length of time; and
- transmit a first group configurations of the first P2P wireless group to the plurality of vehicles to allow the plurality of vehicles to join the first P2P wireless group.

16. The non-transitory computer-readable medium of claim 15, further comprising instructions that, when executed by the processor, cause the processor to:
- predict a predicted leaving time indicting when the first group owner will leave the vehicular micro cloud;
- select a second vehicle from the plurality of vehicles to act as a second group owner of a second P2P wireless group before the predicted leaving time;
- instruct the second vehicle to create the second P2P wireless group before the predicted leaving time; and
- transmit second group configurations of the second P2P wireless group to the plurality of vehicles to allow the plurality of vehicles to join the second P2P wireless group before the predicted leaving time.

17. The non-transitory computer-readable medium of claim 16, further comprising instructions that, when executed by the processor, cause the processor to forward data transmitted from a member of the first P2P wireless group to a member of the second group and vice versa before the predicted leaving time.

* * * * *